United States Patent [19]

Eaton

[11] 4,187,539

[45] Feb. 5, 1980

[54] PIPELINED DATA PROCESSING SYSTEM WITH CENTRALIZED MICROPROGRAM CONTROL

[75] Inventor: John R. Eaton, Salford, England

[73] Assignee: International Computers Limited, London, England

[21] Appl. No.: 819,868

[22] Filed: Jul. 28, 1977

[30] Foreign Application Priority Data

Aug. 17, 1976 [GB] United Kingdom ............. 34259/76

[51] Int. Cl.² .......................... G06F 9/20; G06F 9/06
[52] U.S. Cl. ................................................. 364/200
[58] Field of Search ... 364/200 MS File, 900 MS File, 364/736

[56] References Cited

U.S. PATENT DOCUMENTS

| | | | |
|---|---|---|---|
| 3,626,374 | 12/1971 | Chinlund | 364/200 |
| 3,728,692 | 4/1973 | Fennel, Jr. | 364/200 |
| 3,787,673 | 1/1974 | Watson et al. | 364/200 X |
| 3,875,391 | 4/1975 | Shapiro et al. | 364/200 X |
| 3,900,836 | 8/1975 | Salvo | 364/200 |
| 3,949,379 | 4/1976 | Ball | 364/200 |
| 3,956,738 | 5/1976 | Tessera | 364/200 |
| 3,978,452 | 8/1976 | Barton et al. | 364/200 |
| 3,988,719 | 10/1976 | Whitby et al. | 364/200 |
| 4,025,771 | 5/1977 | Lynch, Jr. et al. | 364/200 X |
| 4,057,846 | 11/1977 | Cockerill et al. | 364/200 |

Primary Examiner—Melvin B. Chapnick
Attorney, Agent, or Firm—Hane, Roberts, Spiecens & Cohen

[57] ABSTRACT

A pipelined data processing system having n processing stages, each of which is under the control of a central microprogram. Each microprogram instruction is decoded to produce n control signals, one for each processing stage. Microprogram start addresses are generated by combining information from the latest n program instructions received. Thus, each microprogram sequence implements a combination of phases of successive program instructions. A flag register is used to store relatively static control information, and effectively provides an extension of the microprogram instruction.

1 Claim, 6 Drawing Figures

(FIG. 6)

DATA FLOW

MICROPROGRAM CONTROL UNIT

PIPELINED DATA PROCESSING SYSTEM WITH CENTRALIZED MICROPROGRAM CONTROL

BACKGROUND OF THE INVENTION

This invention relates to data processing systems.

In one form of data processing system which has been proposed, the execution of each program instruction is divided into a number of phases, and each of these phases is performed by a different processing stage of the system, so that the execution of successive instructions can be overlapped. Such a system is referred to as a pipeline processor, since the flow of instructions through the processing stages is analogous to the flow of fluid through a pipeline.

The advantage of a pipeline processor is that it can achieve high processing rates, as a result of the parallel operation of the multiple processing stages. The effective processing speed is determined by the rate at which execution of the instructions can be initiated, rather than by the time required to execute each individual instruction.

However, pipeline processors present considerable problems in synchronising and co-ordinating the operation of the various processing stages, to ensure that all the necessary operations are performed in the correct sequence, and to prevent situations where no stage can proceed further since each is waiting for another to complete some task, or where two stages attempt to access a store or a register simultaneously. This involves a considerable number of specially designed logic circuits, with the result that such systems tend to be very expensive.

One object of the present invention is to provide a novel form of data processing system in which execution of instructions can be overlapped, but which avoids the above mentioned problems.

SUMMARY OF THE INVENTION

According to one aspect of the invention, there is provided a data processing system comprising:
- a plurality n of data processing stages for performing respective phases of execution of a program instruction;
- a microprogram control unit having a microprogram store holding a plurality of sequences of microinstructions, each microinstruction being effective to produce n control signals in parallel for the n respective data processing stages; and
- means for receiving a sequence of program instructions and for producing, in response to the latest n instructions received, a microprogram start address for causing the microprogram control unit to initiate a corresponding one of the microprogram sequences.

Thus, it will be seen that in the present invention the various processing stages are all controlled by a single microprogram control unit. Since the control is centralised, it is a relatively simple matter to prevent store access clashes, and to ensure that all operations are performed in the correct sequence, since all these factors are under the control of a single microprogram. Moreover, the design can readily be varied, by rewriting the microprogram, and the hardware in the processing stages can thus be standardised at an early stage in the design process.

It should be noted that an important feature of the invention is that microprogram sequences implement combinations of instructions at different stages of execution, in contrast to conventional microprogrammed machines in which each microprogram sequence only implements a single instruction.

BRIEF DESCRIPTION OF DRAWINGS

One data processing system in accordance with the invention will now be described, by way of example, with reference to the accompanying drawings of which.

DESCRIPTION OF THE PREFERRED EMBODIMENT INSTRUCTION OVERLAP

Before considering the structure of the system, the way in which execution of instructions is overlapped will first be described.

In the present system, instructions are either direct or indirect, according to whether the location of the operand is specified directly by the instruction, or indirectly by way of a pointer.

Figure 1:
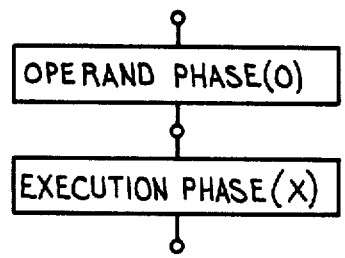
FIGS. 1 and 2 show the phases of execution of direct and indirect instructions.

Referring to FIG. 1, the execution of a direct instruction is divided into two phases:
- (O) The Operand phase. This comprises the generation of the address of the operand and the reading of the operand from the store.
- (X) The execution phase. This involves the performance of a specified operation upon the operand, writing the result into the store if required, and then incrementing the program counter or inserting a jump address into it.

Figure 2:
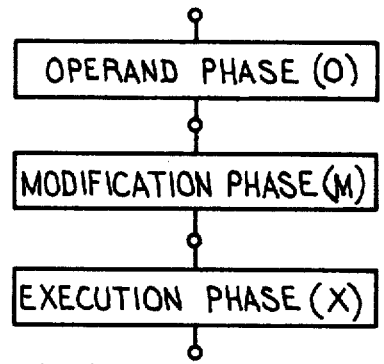

Referring to FIG. 2, the execution of an indirect instruction is divided into three phases:
- (O) The Operand phase. This is similar to the direct case, but instead of the operand itself, a pointer to the operand is retrieved.
- (M) Modification Phase. This involves modifying the pointer in some specified manner to give the address of the operand, which is then retrieved.
- (X) Execution phase. This is the same as in the direct case.

Figure 3:
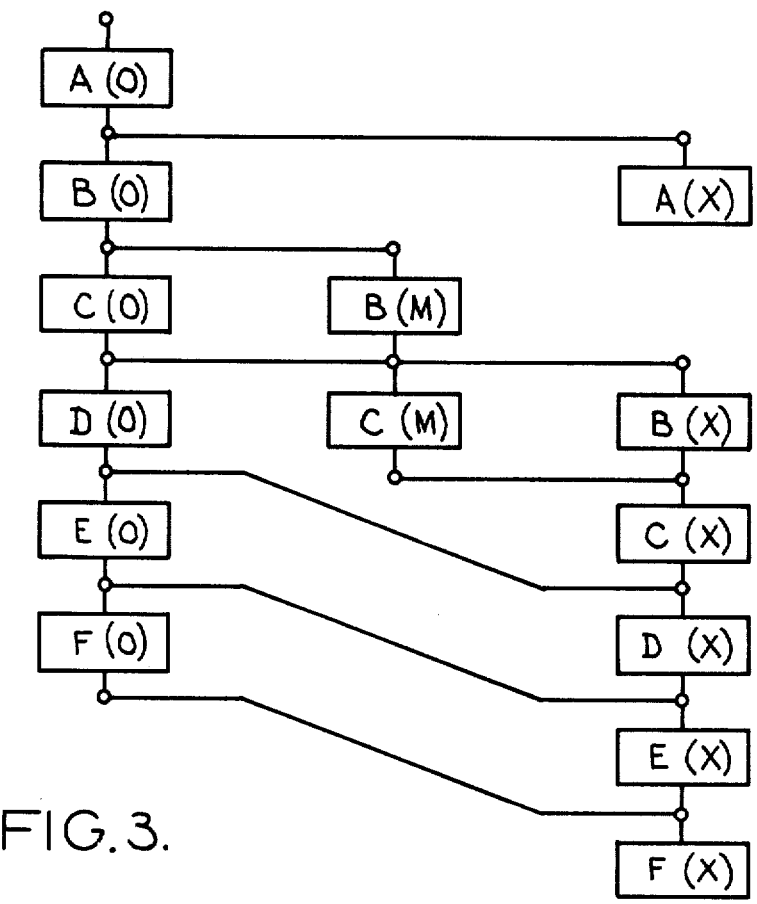
FIG. 3 illustrates the way in which instructions are overlapped in the system.

As will be described, the present system has three separate processing stages, which permit the execution of up to three successive instructions to be overlapped. For example, consider a sequence of six instructions A to F of which B and C are indirect instructions and the rest are direct. Then these instructions are overlapped in the system as shown in FIG. 3, in which it can be seen that the execution phase A(X) of instruction A is overlapped with the operand phase B(O) of instruction B, and so on. The most complex overlap situation occurs when phases of three different instructions are executed simultaneously, as in the step when D(O), C(M) and B(X) are executed.

GENERAL DESCRIPTION OF SYSTEM

Figure 4:
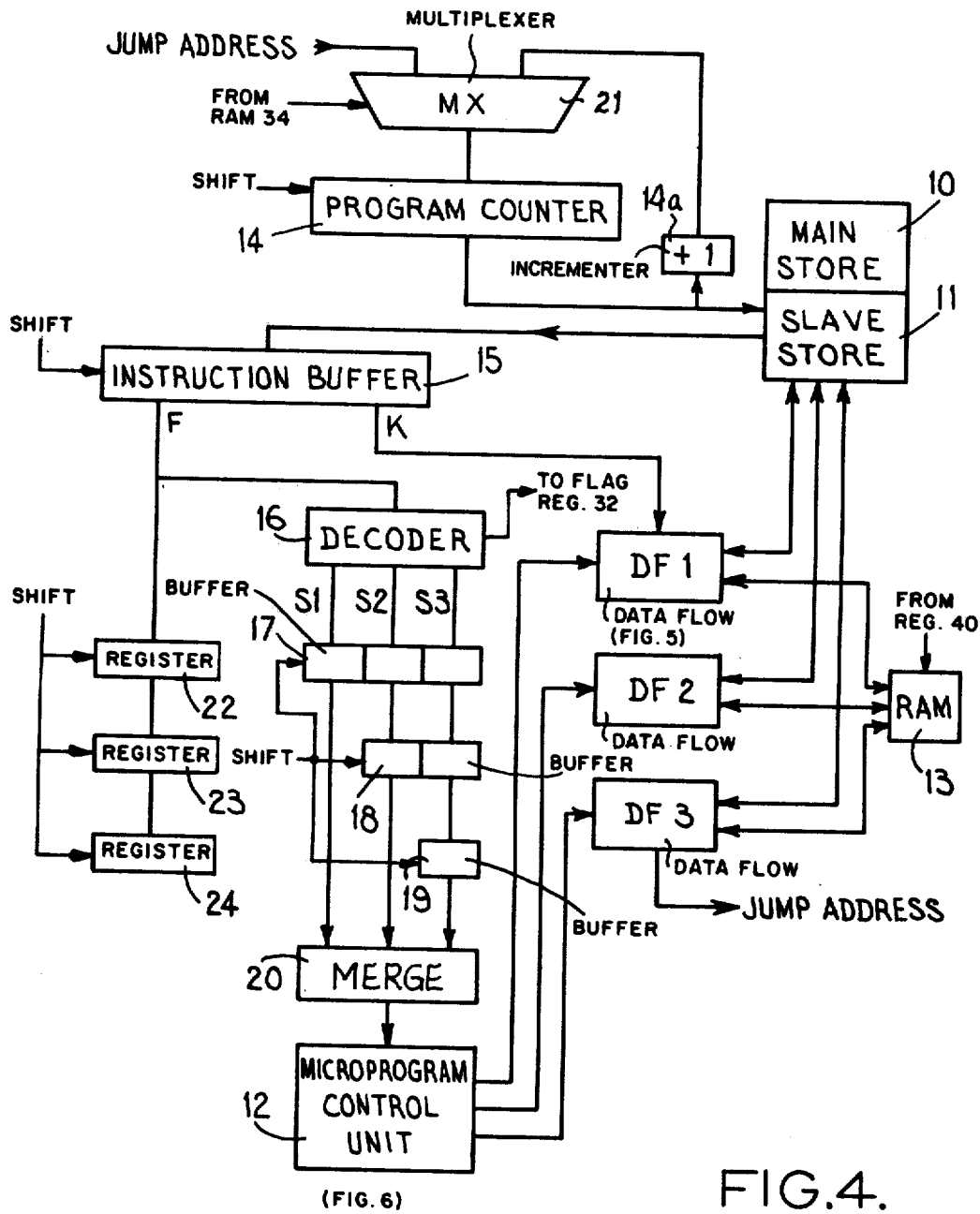
FIG. 4 is a block diagram of the system.

Referring now to FIG. 4, the system comprises a main store 10 which holds operands and program instructions for the system. The store has an associated slave store mechanism 11 which includes a relatively small, fast slave store. The slave store holds copies of data likely to be required in the near future, and whenever an item of data is requested from the main store, a check is first made to determine whether the request can be satisfied by an access to the slave store. Ideally, most store accesses can be satisfied by the slave store, with the result that the average retrieval time approaches that of the slave store.

Such slave store mechanisms are well known, and therefore further details will not be discussed here.

The system has three processing stages, referred to herein as data flows DF1–DF3. These are respectively dedicated to performing the operand phase (O), the modification phase (M), if any, and the execution phase (X) of each instruction. These three stages are operable simultaneously in parallel and form an instruction execution pipeline in which the execution of up to three program instructions can be overlapped, as described above with reference to FIG. 3.

The three data flows are controlled by a central microprogram control unit 12 which issues control signals to all three data flows simultaneously, so as to cause them to execute, in parallel, the current phases of the instructions currently in the pipeline. For example, in the fourth step of the sequence shown in FIG. 3, the control signals will be such as to cause DF1 to perform the operand phase of instruction D, DF2 to perform the modification phase of instruction C, and DF3 to perform the execution phase of instruction B. Of course, where there are fewer than three instructions currently in the pipeline, some of these control signals may be "null" signals, which cause one or more of the data flows to remain idle.

The data flows DF1–DF3 are connected to the main store 10 (by way of the slave store mechanism 11) so as to permit them to address and to read and write data from and to the store as required. The data flows also have access to a relatively small, fast random access memory (RAM) 13 which is used for transferring partial results and other information between them.

The addressing of program instructions in the main store is effected by a program counter 14.

The contents of the program counter 14 can be incremented by means of an incrementing circuit 14a and multiplexer 21, so as to step sequentially through the program. Alternatively, the multiplexer 21 can be operated (by a control signal from the microprogram control unit 12) so as to load a jump address into the program counter 14. This jump address is obtained from the third data flow DF3.

There are thus four different sources from which the store 10 can be addressed: the three data flows DF 1–DF 3, and the program counter 14. All of these sources are controlled by the microprogram control unit, which ensures that only one of them addresses the store at any given time.

Each instruction can be considered as comprising two portions F and K. The F portion is a code representing the function to be performed by the instruction, while the K portion specifies the operand on which the function acts. K may represent an operand (or pointer) address, or may represent a displacement value to be added to the contents of a base register to produce the operand address, or may represent a literal operand.

When an instruction is fetched from the main store, it is placed in an instruction buffer 15. The K portion is then fed to the first data flow DF 1, for use during the execution of the first phase of the instruction. The F portion is applied to a decoder 16 where it is decoded to generate three signals as follows:

(S1) This signal specifies the actions which have to be performed by the first data flow DF1 during the first phase of execution of the instruction, according to the operand type of the instruction.

(S2) This specifies the actions to be performed by the second data flow DF2 during the second phase of an indirect instruction. In the case of a direct instruction, a null action is specified.

(S3) This specifies the actions to be performed by the third data flow DF3 during the final phase of execution.

This fetching and decoding of the next instruction is overlapped with the execution of the instructions currently in the pipeline.

These three signals S1–S3 are placed in a first pipline buffer 17, where they are held while the first phase of the instruction is executed. The latter two signals S2 and S3 are then transferred to a second pipeline buffer 18, where they are held during execution of the second phase of the instruction (assuming it is an indirect instruction). Finally, the signal S3 is transferred to a third pipeline buffer 19 where it is held while the final phase of the instruction is executed.

Thus it can be seen that the first signal S1 flows down a single stage pipeline, the second signal S2 flows down a two-stage pipeline, while the third signal S3 flows down a three-stage pipeline. The outputs from these pipelines (i.e. the S1 signal from the first pipeline buffer 17, the S2 signal from the second pipeline buffer 18, and the S3 signal from the third buffer 19) are applied to a merging circuit 20 which merges these signals together to produce an output signal which combines the information of all three signals, This merged signal is applied to the microprogram control unit 12 where it is used to generate a microprogram start address and hence to initiate a corresponding microprogram sequence.

Thus, it can be seen that the selection of the microprogram sequence depends upon the combination of the S1 signal in the first pipeline buffer, the S2 signal in the second, and the S3 signal in the third. In other words, the choice of microprogram sequence depends on the combination of the operand type of the instruction currently at the first stage of the pipeline, the modification type of the instruction at the second stage, and the execution type of the instruction at the third stage.

If every possible combination of operand, modification and execution type was implemented by a separate microprogram sequence in this manner, the result could be a very large number of microprogram sequences. For example, if there were 64 different execution types, 8 different modification types, and 64 different operand types, then $64 \times 8 \times 64 = 40$ thousand (approximately) different microprogram sequences would be required. If the average sequence in length is three microinstructions, then the total microprogram size would be about 120 thousand microinstructions, which is very large indeed.

The problem can be reduced by implementing only the most commonly occurring instruction types in the manner described above, and implementing the remainder in the conventional way, with a microinstruction sequence for each program instruction, and without any overlapping of execution. If only the 32 most frequently occurring execution types, the 4 most frequent modification types, and the 16 most frequent operand types are chosen, only four thousand microinstructions would be required, which is a more reasonable number. This is achieved by arranging for the decoder 16, upon detecting one of the less common instruction types, to produce a signal which causes the processor to enter the non-overlapping mode. This prevents the instruction in question from entering the pipeline until all preceding instructions have been completed, and prevents any subsequent instructions from entering the pipeline until the instruction in question has been completed.

As indicated in the drawing, the contents of the instruction buffer 15 are applied to a series of registers 22, 23, 24, in synchronism with the flow of signals through the pipeline buffers 17, 18, 19. The contents of these registers are not used by the system in normal operation, but serve as a record of which instructions are currently in the pipeline, for monitoring and diagnostic purposes.

DATA FLOW

Figure 5:
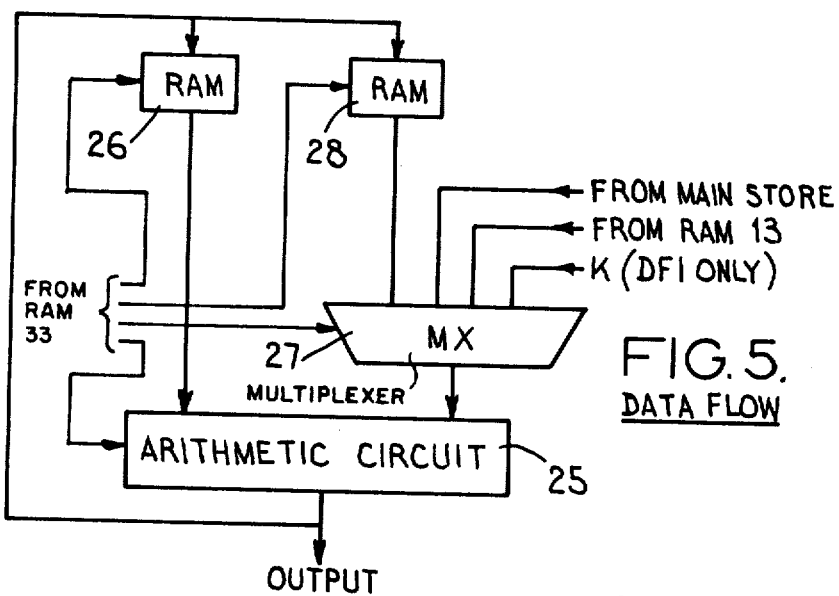
FIG. 5 shows one of the data flows in more detail.

The three data flows DF1-DF3 are preferably formed as standardised units, and are substantially identical in structure, although of course they perform different functions. FIG. 5 shows one of the units in detail.

The heart of the data flow is an arithmetic circuit 25 which can perform additions, subtractions and comparisons upon a pair of input operands. One of these operands is derived from a random access memory (RAM) 26, while the other can be derived, by way of a multiplexer 27, from a second RAM 28. In operation, these two RAMs 26, 28 are arranged to hold identical copies of the same information, and act as alternative sources of this information, allowing any pair of operands held in them to be accessed simultaneously. These RAMs provide local working space for the data flow, as well as providing certain specially defined registers (e.g. base registers, program status registers etc.).

The multiplexer 27 can alternatively select the second operand from the output of the main store, or of the RAM 13 or (in the case of DF1) from the K portion of the instruction buffer 15.

The result output of the arithmetic circuit is applied back to the data inputs of the RAMs 26, 28 and can be written into them both simultaneously. The output of the arithmetic circuit can also be applied to the address register (not shown) of the main store, or can be used as input data for the main store or the RAM 13, or (in the case of DF3) can be applied to the program counter 14 as a jump address.

MICROPROGRAM CONTROL UNIT

Figure 6:
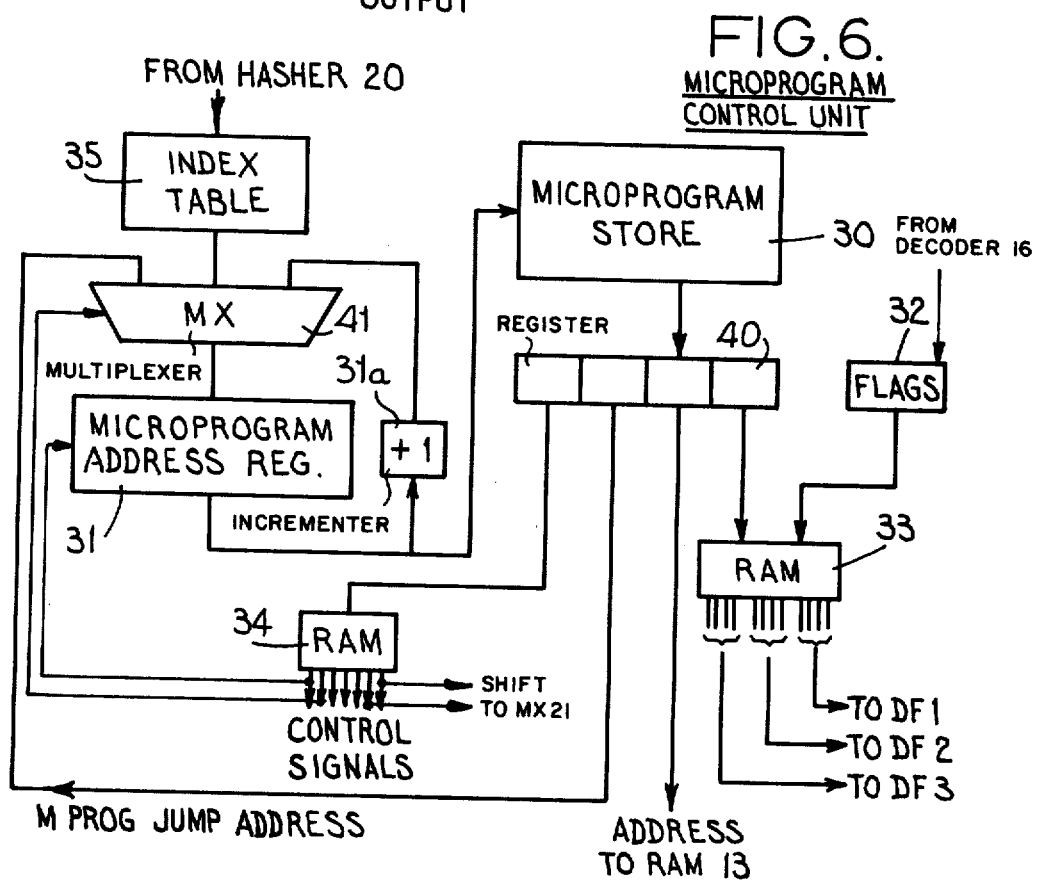
FIG. 6 shows the microprogram control unit in more detail.

Referring now to FIG. 6, the microprogram control unit includes a microprogram store 30 which holds the sequences of microinstructions referred to above. This store is addressed by means of a microprogram address register 31, and, in operation, microinstructions are read out of the store one at a time into a register 40 for execution.

Each microinstruction has to specify the actions to be performed simultaneously by the three separate data flows DF1-DF3. This implies the need for a very wide microinstruction, containing a large amount of information. However, wide microinstructions are expensive, since they require a large amount of storage space. To avoid this problem the portion of the microinstruction concerned with providing control signals for the data flows is combined with the contents of a flag register 32, before being decoded, by means of a random access memory 33, to produce the control signals for the data flows. The flag register 32 is arranged to hold relatively static control information, which does not change very often from one microinstruction to the next, while the microinstructions provide the more variable part of the control information. As a result, the microinstruction is considerably shorter than it would be if it held all the control information for the data flows.

The flag register 32 can be updated, when required, by means of special microinstructions or from decoder 16.

The control signals from the decode memory 33 control the random access memories 26, 28, the multiplexer 27, and the function of the arithmetic unit 25 in the three data flows.

Other portions of the microinstruction provide an address for the random access memory 13, and a jump address for writing into the microprogram address register 31 in the event of a jump in the microprogram.

The remaining portion of the microinstruction is decoded (by means of a random access memory 34) to produce control signals for controlling a multiplexer 41 so as to select one of the following three signals for loading into the microprogram address register 31: (i) the existing contents of the register 31, incremented by unity by means of an incrementing circuit 31a; (ii) a microprogram jump address, derived from the register 40; and (iii) a microprogram start address derived from a writable index table 35. The decode memory 34 also produces, at the end of each microprogram sequence, a "shift" signal which causes the contents of the pipeline buffers to be shifted forward by one stage i.e. causes the contents of buffer 18 to be put into buffer 19, those of buffer 17 to be put into buffer 18, and the output of the decoder 16 to be entered into buffer 17. The "shift" signal also initiates the fetching of another program instruction from the main store into the instruction buffer 15. This signal also loads the microprogram address register 31 with the start address of the next microprogram sequence to be executed. The writable index table 35, is addressed by the output of the merging circuit 20. Thus, the choice of the new microprogram sequence will depend on the new contents of the buffers 17, 18, 19 after shifting.

CONCLUSION

In summary, it can be seen that the system described above can achieve high processing speeds, because of its overlapped operation, without the problems of interlocking usually associated with pipeline processors. Moreover, the system is very flexible because it is microprogrammed.

All the individual elements shown in the drawings are conventional per se, and may be implemented using any suitable commercially available logic components such as, for example, Fairchild TTL/MSI components.

Thus, for example, the elements labelled 14, 15, 17, 18, 19, 22, 23, 24, 31, 32 and 40 may each be implemented using an appropriate number of Fairchild type 9314 MSI latch components. The decoder 16 may be implemented using Fairchild type 93402 programmable decoder (contents addressable memory) components. The multiplexers 21, 27 and 41 may be implemented using Fairchild type 9309 multiplexers. The elements 13, 26, 28, 30, 33, 34 and 35 may be implemented using Fairchild type 93410 fully-decoded 256-bit random access memories. The incrementers 14a and 31a may be implemented using Fairchild type 9383/7483 4-bit full adder components. The arithmetic circuit 25 may be implemented using Fairchild type 9340 4-bit arithmetic logic units.

The two-level storage system comprising the main store 10 and the slave store 11 is well known in the art, one such system being described for example in U.S. Pat. No. 3,588,829.

I claim:

1. A data processing system comprising a plurality n of simultaneously operable data processing stages each of which contains an arithmetic unit for performing arithmetic operations on data in response to control signals, program control means for producing a sequence of control codes, a new control code being produced each time a shift signal is received by the program control means, and a plurality n of buffers connected in series, the first buffer in the series being connected to the output of the program control means, and each buffer being clocked by said shift signal so that when a said shift signal occurs the contents of each buffer is transferred into the next buffer, if any, in the series and the control code currently produced by the program control means is transferred into the first buffer in the series, whereby at any given time the series of buffers contains the latest n control codes produced by the program control means, wherein the improvement comprises (a) means connected to all the buffers for merging together the current contents of all the buffers to form a single microprogram start address;

(b) a microprogram store containing a plurality of sequences of microinstructions;

(c) microprogram sequencing means, connected to receive the microprogram start address from the merging means, for producing a sequence of microprogram addresses starting at said microprogram start address, and for applying the sequence of microprogram addresses to the microprogram store so as to read out a corresponding sequence of microinstructions therefrom; and (d) microinstruction decoding means for decoding each microinstruction read out of the store, to produce said control signals which are applied to said n data processing stages, and for producing said shift signal at the end of each sequence of instructions.

* * * * *